United States Patent [19]
Koyasu

[11] Patent Number: 5,563,797
[45] Date of Patent: Oct. 8, 1996

[54] WIRE-CUT DISCHARGE MACHINE HAVING A DISPLAY FOR GUIDING RETURNING OF WORKPIECE TO MACHINING START POSITION

[75] Inventor: Takayuki Koyasu, Nagoya, Japan

[73] Assignee: Brother Kogyo Kabushiki Kaisha, Nagoya, Japan

[21] Appl. No.: 342,696

[22] Filed: Nov. 21, 1994

[30] Foreign Application Priority Data

Nov. 19, 1993 [JP] Japan .................................. 5-314434

[51] Int. Cl.$^6$ .............................. G06F 19/00; G06G 7/64; G06G 7/66
[52] U.S. Cl. .............................. 364/474.04; 364/474.12; 219/69.12
[58] Field of Search .............................. 364/474.04, 474.12; 219/69.12, 69.13, 69.17

[56] References Cited

U.S. PATENT DOCUMENTS 4,506,129  3/1985  Katsube et al. .................. 219/69.12
4,644,124  2/1987  Hori et al. ...................... 364/474.04

Primary Examiner—Roy N. Envall, Jr.
Assistant Examiner—Karen Presley
Attorney, Agent, or Firm—Kane, Dalsimer, Sullivan, Kurucz, Levy, Eisele and Richard

[57] ABSTRACT

In a wire-cut discharge machine, a workpiece fixedly mounted on a movable table is returned from the present position to a machining start position so that auxiliary objects, such as clasps for holding the workpiece, and structural objects, such as the nozzle of the wire-cut discharge device, do not interfere with each other. Relative coordinate values between the machining start position and the present position are calculated and the calculated results are displayed on a display device. The workpiece is moved in an X-direction and is then moved in a Y-direction toward the machining start position based on moving data corresponding to the calculated results.

7 Claims, 6 Drawing Sheets

WIRE-CUT DISCHARGE MACHINE HAVING A DISPLAY FOR GUIDING RETURNING OF WORKPIECE TO MACHINING START POSITION

BACKGROUND OF THE INVENTION

1. Field of the Invention

The present invention relates to a wire-cut discharge machine for machining a workpiece with electrical discharges caused to be occurred between a wire electrode and a workpiece.

2. Description of the Related Art

Conventionally, when a workpiece is subjected machining with such a wire-cut discharge machine, the workpiece is fixedly mounted by the aid of jigs on the upper surface of a movable table. Machining of the workpiece is performed by electric discharges intermittently occurring between the wire electrode and the workpiece. A problem with such a wire-cut discharge machine is that the wire electrode is cut or broken during machining caused by improper setting of machining conditions such as discharge energy, discharge frequency or the like.

To resume machining of the workpiece from the point where the wire is broken, it is necessary that a new wire electrode be passed through an aperture located at the machining start point on the workpiece. So the workpiece is moved back so that the point on the workpiece where the wire electrode is broken is positionally in coincidence with the machining start point.

Japanese Patent Publication KOKOKU No. 2-27089 proposes an automatic returning device for returning the workpiece to the machining start position. Machining start position coordinates representative of the machining start position of the wire electrode relative to the workpiece are determined in advance. When the wire electrode is broken during machining of the workpiece, the present position on the workpiece where the wire electrode is broken is stored in a memory as present position coordinates. Computations are performed to obtain differences in both X-axis coordinate and Y-axis coordinate between the machining start position and the present position. Based on the thus computed X-axis and Y-axis coordinate differences, the workpiece is moved back along a straight line from the present position to the machining start position.

However, if the jigs for fixing the workpiece extends across the straight line to bother the workpiece from returning to the machining start position, the jig is liable to abut against a nozzle which ejects working liquid toward the machine position of the workpiece and damage the nozzle.

SUMMARY OF THE INVENTION

The present invention has been made to solve the aforementioned problem accompanying the conventional wire-cut discharge machine, and accordingly it is an object of the present invention to provide an improved wire-cut discharge machine wherein when a workpiece is returned to a machining singular point, such as a machining start position, from a present position, fittings, such as jigs, of the workpiece are not brought into abutment with a nozzle or other components.

To achieve the above and other object, the present invention provides a wire-cut discharge machine having various functions as illustrated in block form in FIG. 1. The wire-cut discharge machine includes a table movable in X-direction and Y-direction perpendicular to each other. A workpiece is fixedly mounted on the table. Driving means (1) is provided for moving the table in the X-direction and direction. Control means (2) controls the driving means (1) in accordance with machining program data so that the table moves along a programmed path, and during the movement of the table the workpiece is machined by electric discharges generated between the workpiece and the wire electrode. There is provided machining singular point coordinates (MSPC) reading means (3) for reading a machining singular point, such as a machining start position, and outputting machining singular point coordinates (MSPC). Machining singular point coordinates (MSPC) storing means (4) stores data regarding the machining singular point coordinate (MSPC). There is provided present position coordinates (PPC) reading means for reading a present position of the workpiece and outputting present position coordinates (PPC). Relative coordinate (RC) calculating means (6) is supplied with data regarding the MSPC and also data regarding PPC, and based thereon calculates relative coordinates between the machining singular point and the present position. The relative coordinates therebetween are representative of differences between the present position coordinates end the machining singular point coordinates in the respective directions. That is, the relative coordinates has an X axis relative coordinate representative of a difference between the present position coordinate in the X axis and the machining singular point coordinate in the X axis, and a Y axis relative coordinate representative of a difference between the present position coordinate in the Y axis and the machining singular point coordinate in the Y axis. The X axis and Y axis relative coordinates thus calculated by the RC calculating means (6) are outputted to display means (7) for displaying these coordinate values. Moving data (MD) input means (8) receives moving data corresponding to the displayed X axis and Y axis relative coordinate values. In accordance with the moving data, the control means (2) controls the driving means (1) so that the table is firstly moved in the direction of the X axis and then in the direction of the Y axis, or vice versa.

The table may be moved in the direction of the X axis only when the moving data regarding the X axis relative coordinate value is inputted. Likewise, the table may be moved in the direction of the Y axis only when the moving data regarding the Y axis relative coordinate value is inputted.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A wire-cut discharge device according to a preferred embodiment of the present invention will be described while referring to the accompanying drawings.

Figure 1:
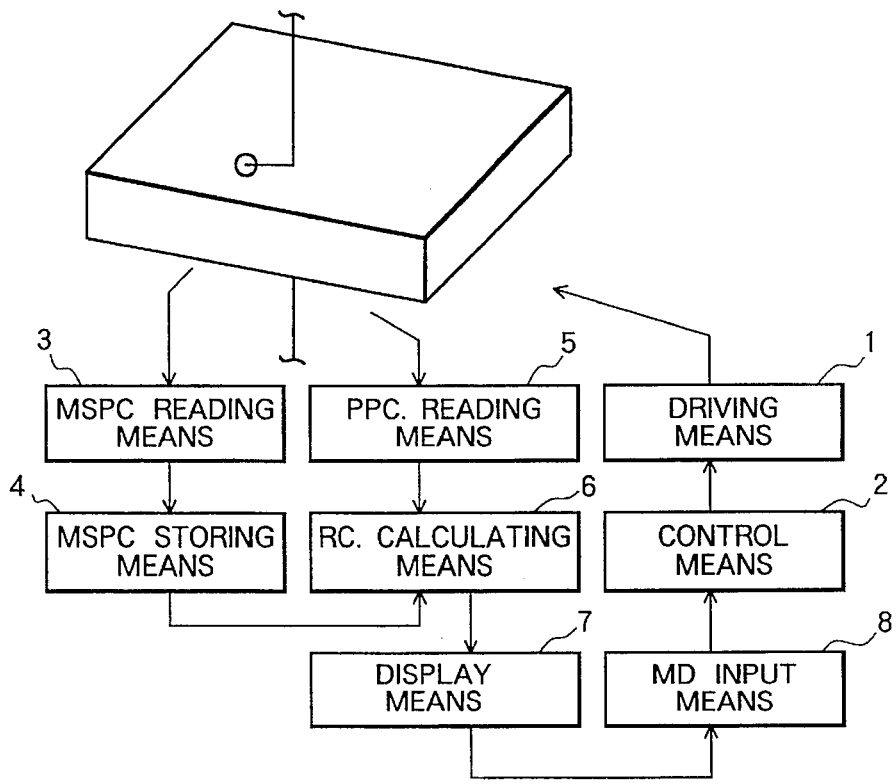
FIG. 1 is an explanatory diagram depicted partly in block form for describing the present invention.
Figure 2:
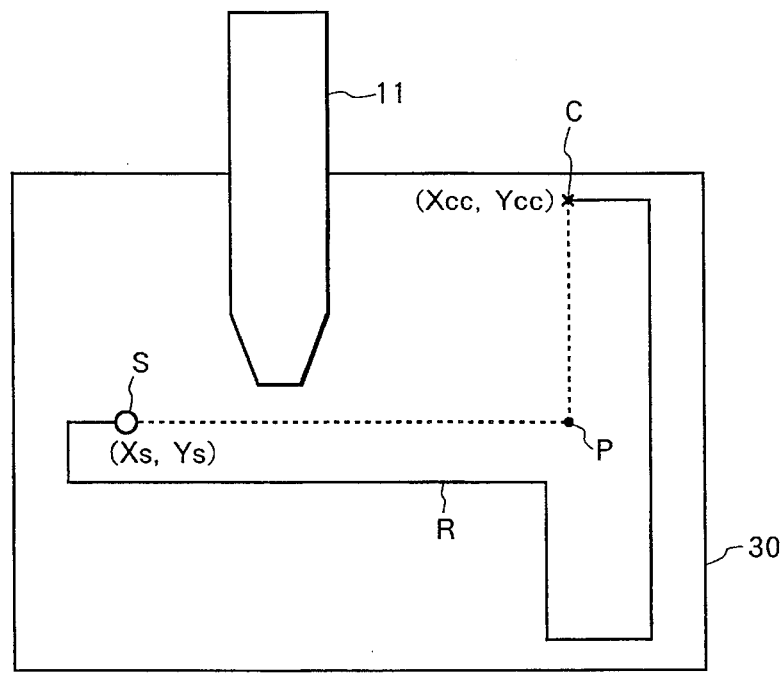
FIG. 2 is an explanatory diagram for describing a relationship between a workpiece, jig and machining paths instructed by program data.
Figure 3:
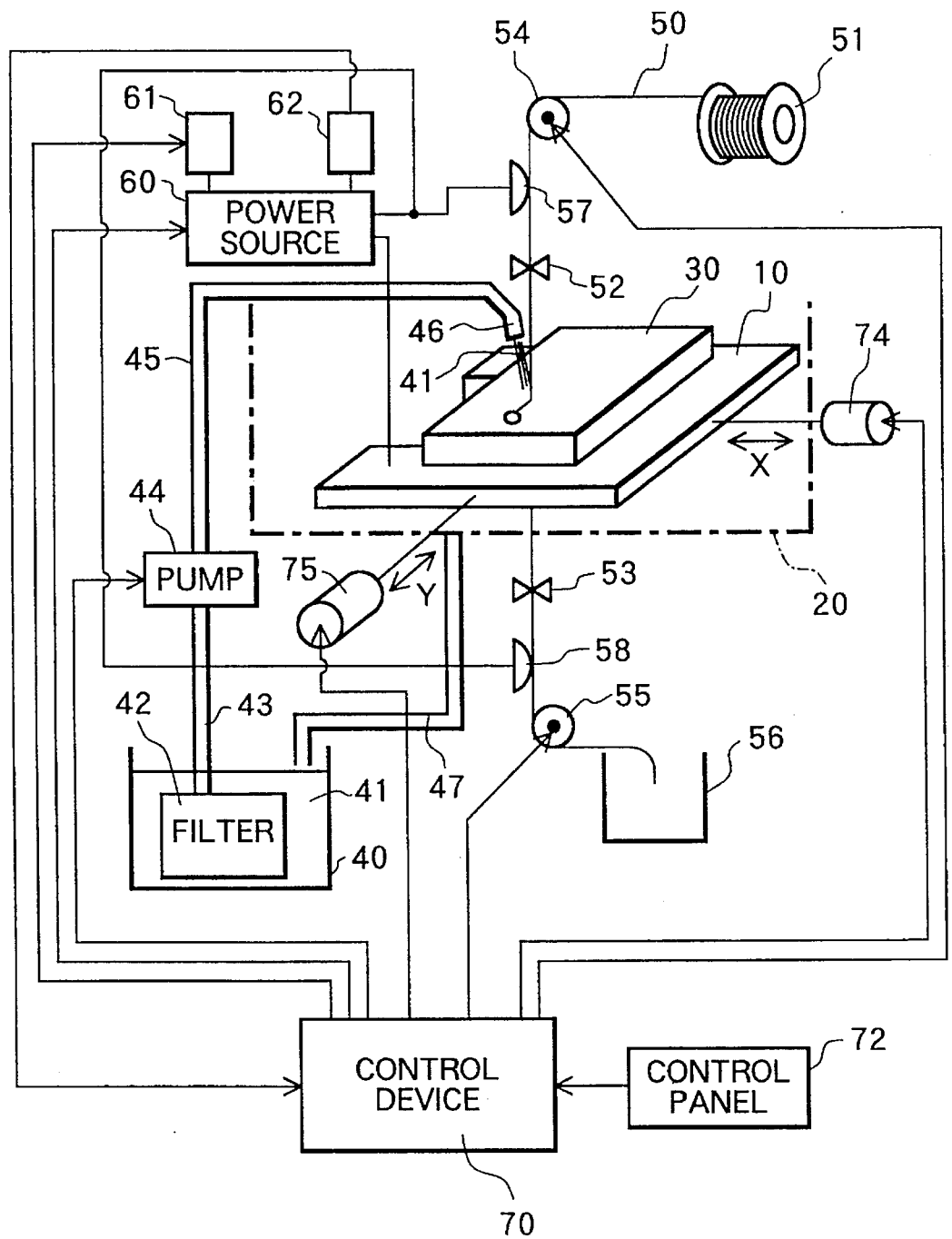
FIG. 3 is schematic diagram illustrating a preferred embodiment of the present invention.

FIG. 3 shows an example of a wire-cut discharge device according to the preferred embodiment. The wire-cut discharge device includes a movable table 10. The movable table 10 is provided to be movable along X and V axes within a plane defined by X and Y coordinates. A workpiece 30 is fixedly mounted on the upper surface of the movable table 10 by a jig or clasp 11 (see FIG. 2). The movable table 10 is housed in a process tank 20 for accumulating working liquid 41.

A working liquid tank 40 is disposed at a position lower than the process tank 20. The working liquid tank 40 stores the working liquid 41. A pipe 47 connects the process tank 20 with the working liquid tank 40. One end of a channel 43 is provided with a filter 42 and is positioned in the working liquid tank 40. The inlet of a pump 44 is connected to the other end of the channel 43. One end of a channel 45 is connected to the outlet of the pump 44. A nozzle 46 is fixed to the other end of the channel 45 and is fixed to a position directly above the workpiece 30.

The working liquid 41 is pumped by the pump 44 out of the working liquid tank 41, through filter 42 and channel 43, and forced into channel 45. The working liquid 41 is elected from the nozzle 46 onto the section of the workpiece 30 being cut. After accumulating in the process tank 20, the working liquid is discharged through the pipe 47 back to the working liquid tank 40.

A wire electrode 50 for cutting the workpiece 30 is wound about a wire bobbin 51. Wire guides 52 and 53 for supporting the wire electrode 50 are positioned respectively above and below the workpiece 30. A tension roller 54 for regulating tension of the wire electrode 50 is provided between the wire bobbin 51 and the wire guide 52. A ware electrode drive motor 55 for pulling the wire electrode 50 downward is provided below the wire guide 53. A ware discharge portion 56 is provided beneath the wire electrode drive motor 55 for collecting discharged wire electrode 50.

The wire electrode 50 is unwound from the wire bobbin 51, threaded past the tension roller 54 and the wire guide 52, through a hole in the workpiece 30, past the wire guide 53 and the wire electrode drive motor 55, and into the wire discharge portion 56.

An upper electric supply 57 and a lower electric supply 58 for applying e discharge pulse voltage to the wire electrode 50 are positioned along the path of the wire electrode 50 above the wire guide 52 and below the wire guide 53, respectively. A power source 60 is provided for applying pulsed voltage to the electric supplies 57 and 58. When the electric supplies 57 and 58 are energized, a discharge is generated between the workpiece 30 and the wire electrode 50. The power source 60 is controlled by a discharge pulse control 61, which is controlled by a control device 70 (to be described later), so that the above-described discharge pulsed voltage is generated.

Figure 4:
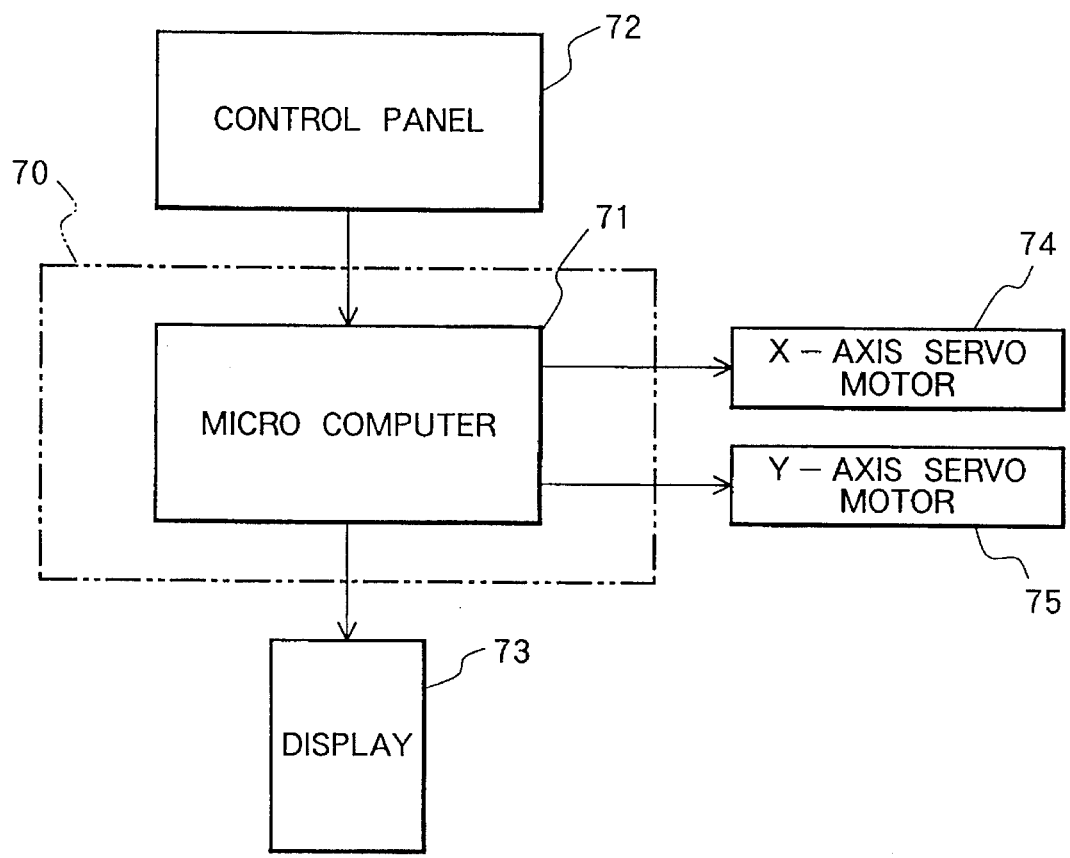
FIG. 4 is a block diagram sowing an electric circuit employed in the embodiment of the invention.
Figure 5:
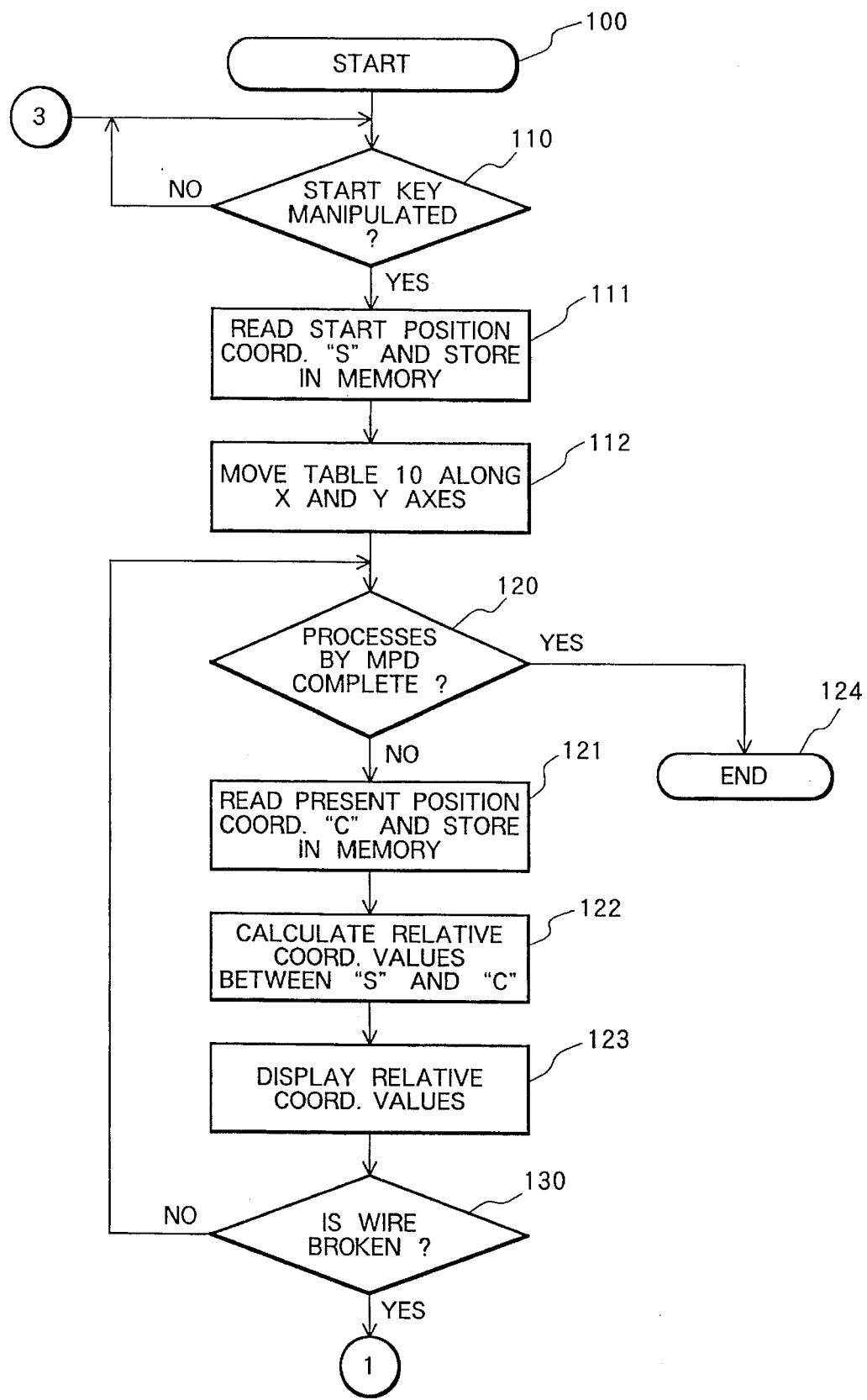
FIG. 5 is a flowchart for describing a part of processes executed by a microcomputer.
Figure 6:
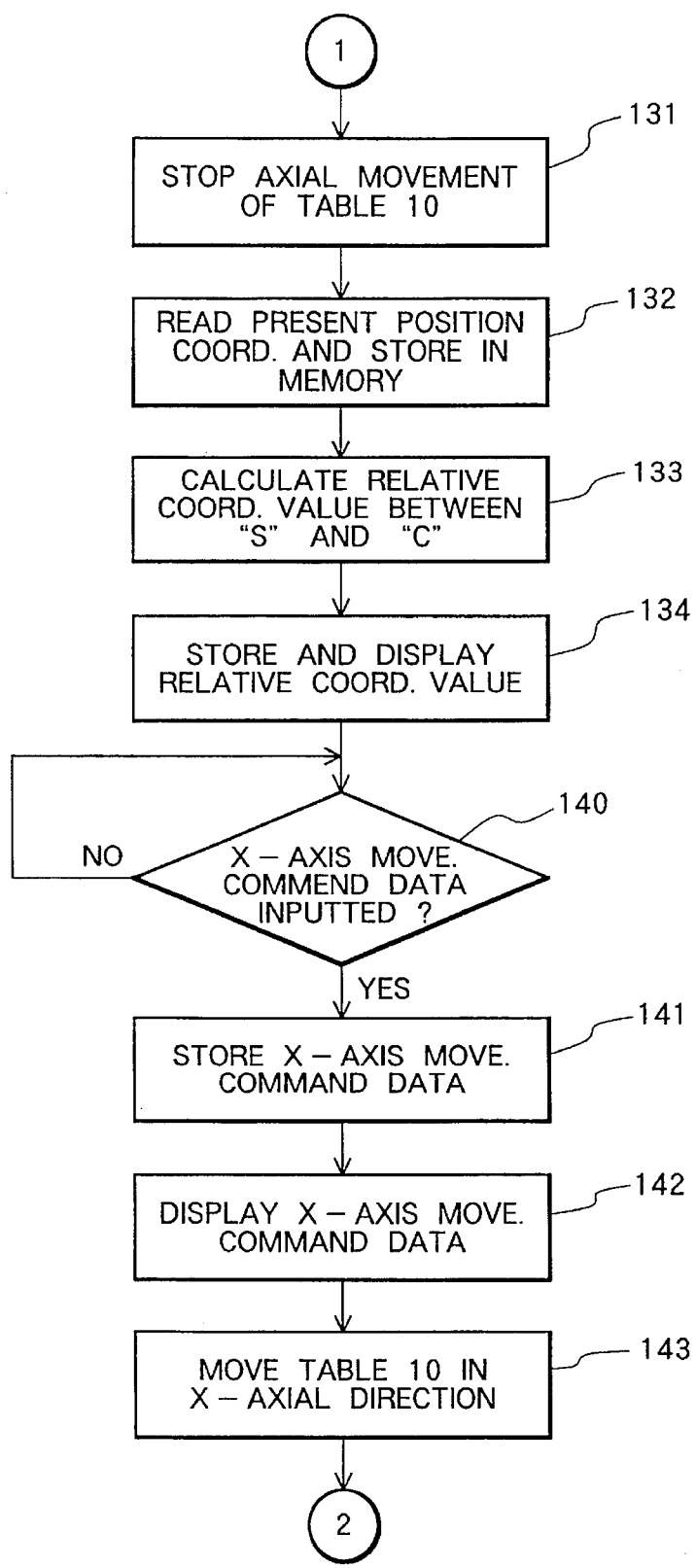
FIG. 6 is a flowchart for describing another part of processes executed by the microcomputer.
Figure 7:
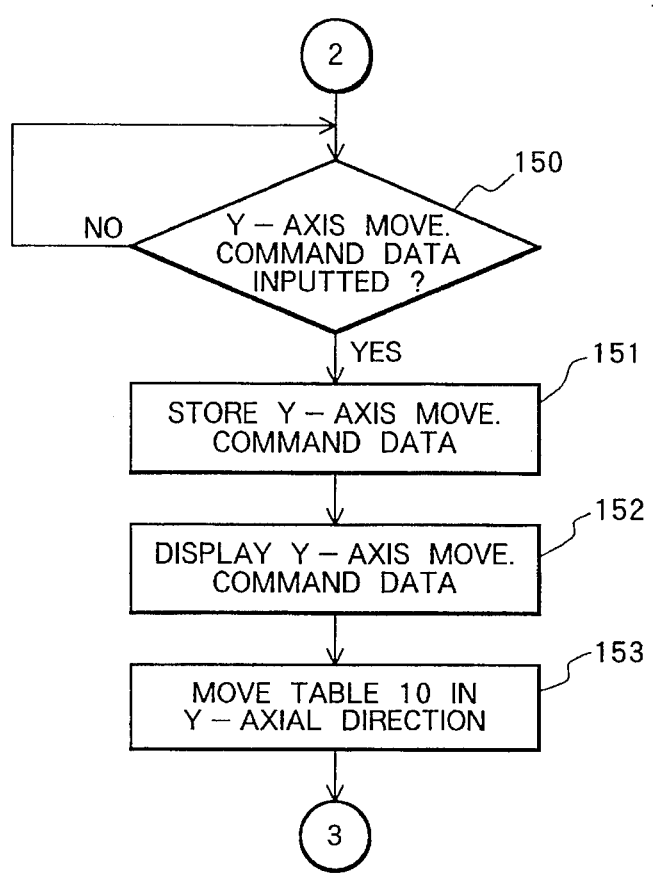
FIG. 7 is a flowchart for describing the remaining part of processes executed by the microcomputer.

As shown in FIG. 4, the control device 70 includes a microcomputer 71. The microcomputer 71 executes computer programs following the flowcharts shown in FIGS. 5 through 7 and in association with the control panel 72, an inter-terminal voltage detection circuit 62, and the like. During execution of these computer programs, calculations are performed for controlling drive of the display 73, the X axis servo motor 74, and the Y axis servo motor 75. The inter-terminal voltage detection circuit 62 detects voltage between the wire electrode 50 and the workpiece 30 via the output of the power source 60. The display 73 is for displaying data from the microcomputer 71 on X and Y coordinates that correspond to the position where machining is being performed on the workpiece 30. The X axis servo motor 74 is for driving the movable table 10 along the X axis. The Y axis servo motor 75 is for driving the movable table 10 along the Y axis perpendicular to the X axis. The wire electrode 50 unwound from the bobbin 51 extends in Z axis perpendicular to both the X axis and Y axis. Computer programs are stored in the memory (not shown) of the microcomputer 71. Each type of data stored in the memory during calculation processes of the microcomputer 71 are backed up go they will not be erased when supply of power is interrupted or cut off. The control device 70 is for controlling the pump 44, the tension roller 54, the wire electrode drive motor 55, the power source 60, and the discharge pulse control 61.

Description will now be made with respect to an example of cutting the workpiece 30 following a programmed path R (indicated by the solid line in FIG. 2) based on a machining program illustrated in the flowcharts in the drawings. A machining command based on the machining program data is inputted to the microcomputer 71 from the control panel 72 to cut the workpiece 30 along the path R. When the wire-cut discharge device is operated, the execution of machining program is started in step 100 of the flowchart shown in FIG. 5. At the start of the machining program, the wire electrode 50 is positioned in the start position S of the workpiece 30 (refer to FIG. 2). When a start operation command is inputted to the control device 70 by manipulation of the start key on the control panel 72, the microcomputer 71 makes a YES determination in step 110. In step 111 the start position coordinates S (Xs, Ys), which indicate the start position S of the workpiece 30, are read or determined from the rotation angles of the X axis servo motor 74 and the Y axis servo motor 75 and are stored in the memory.

Next, in step 112 the microcomputer 71 starts calculation processes required for controlling drive of the X axis servo motor 74 and the Y axis servo motor 75 as required to perform machining of the workpiece 30 according to machining commands, which are based on machining program data inputted from the control panel 72. When the microcomputer 71 starts calculation processes, the control device 70 outputs calculation process data to the X axis servo motor 74 and the Y axis servo motor 75. As a result, the X axis servo motor 74 and the Y axis servo motor 75 are driven to start moving the movable table 10 along the X and Y axes. Machining processes performed by the wire electrode 50 against the workpiece 30 are started according to the machining program data.

Afterward, when the machining program data (MPD) shows that processes are complete, the microcomputer 71 makes a NO determination in step 120. In step 121 the present position coordinates C (Xc, Yc), which indicate the present position of the wire electrode relative to the workpiece 30, are read based on the respective rotation angles of the X axis servo motor 74 and the Y axis servo motor 75 and are stored in the memory. Next, in step 122 the microcomputer 71 calculates the relative coordinate values for the X axis direction and the Y axis direction (Xc-Xs, Yc-Ys) based on the present position coordinate C and the start position coordinate S. In step 123 the microcomputer 71 outputs the calculated relative coordinate values (Xc-Xs, Yc-Ys) to the display device 73. As a result, the display device 73 displays the relative coordinate values (Xc-Xs, Yc-Ys) in the present situation.

While processes are being correctly performed on the workpiece 30 without the wire electrode 50 breaking, the calculation processes in steps 130, 120, 121, 122, and 123 are repeated. However, if the wire electrode 50 breaks, for example, at position C shown in FIG. 2, the voltage detected by the inter-terminal voltage detection circuit 62 will indicate an abnormal value. Based on the abnormal value thus detected by the inter-terminal voltage detection circuit 62, the microcomputer 71 makes a YES determination when the computer program reaches step 130 under these circumstances. In step 131 the microcomputer 71 performs calculation processes required for stopping axial movement of the movable table 10 so that the control device 70 immediately stops the X axis servo motor 74 and the Y axis servo motor 75 based on the data calculated for stopping axial movement. Therefore the position of the workpiece 30 can be precisely maintained at the time the wire electrode 50 breaks.

Figure 8:
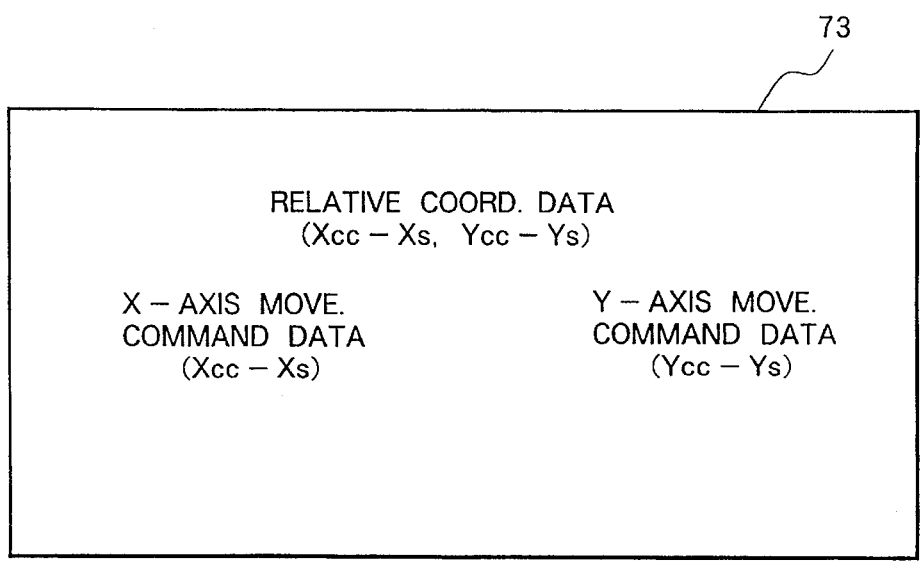
FIG. 8 is an example of a displayed screen.

When the calculation processes in step 131 are completed, in step 132 the microcomputer 71 reads the stop position of the workpiece 30 based on the respective rotation angles of the X axis servo motor 74 and the Y axis servo motor 75 and then stores them in the memory as present position coordinates C (Xcc, Ycc). In step 133 the microcomputer 71 calculates the relative coordinate values (Xcc-Xs, Ycc-Ys) between the start position coordinates S (Xs, Ys) and the present position coordinates C (Xcc, Ycc). In step 134 the microcomputer 71 stores the relative coordinate values (Xcc-Xs, Ycc-Ys) in the memory and also outputs them in the display device 73. Therefore, the display device 73 displays the relative coordinate values (Xcc-Xs, Ycc-Ys) as shown in FIG. 8. As a result, the movement data required for returning the workpiece 30 to the start position S when the wire electrode 50 breaks can be easily visually confirmed.

In this condition, when the ware electrode 50 breaks and the movable table 10, that is, the workpiece 30, is returned from the stop position C to the start position S, the relative X coordinate value (Xcc-Xs) which is displayed in the display device 73 is inputted to the microcomputer 71 as X axis movement command data through manipulation of the relevant keys of the control panel 72. This causes the microcomputer 71 to make a YES determination in step 140. In step 141 the microcomputer 71 receives the X axis movement command data and stores it in the memory. In step 142 the microcomputer 71 displays the X axis movement command data on the display device 73 (see FIG. 8). In step 143 the microcomputer 71 calculates, based on the X axis movement command data, the rotation angle of the X axis required to move the movable table 10, that is, the workpiece 30, from the stop position C to point P along the X axis (see FIG. 2) and outputs the results as rotation angle calculation process data. The control device 70 controls drive of the X axis servo motor 74 based on the rotation angle calculation process data. As a result, the workpiece 30 is moved from the position C, along the broken line shown in FIG. 2, to the position indicated by point P.

At this stage, by manipulating the appropriate key on the control panel 73, the relative Y coordinate value (Ycc-Ys) which is also displayed in the display device 73, is inputted to the microcomputer 71 as Y axis movement command data, whereupon the microcomputer 71 makes a YES determination in step 150. The microcomputer 71 receives the Y axis movement command data and stores it in the memory in step 151. In step 152 the microcomputer 71 displays the Y axis movement command data on the display device 73 (see FIG. 8). In step 153 the microcomputer 71 calculates, based on the Y axis movement command data, the rotation angle of the Y axis required to move the movable table 10, that is, the workpiece 30, from point P along the Y axis to start point S and outputs the results as rotation angle calculation process data. The control device 70 controls drive of the Y axis servo motor 74 based on the rotation angle calculation process data. As a result, the workpiece 30 is moved from the position P, along the broken line shown in FIG. 3, to the position indicated by start position S.

As described, according to the present embodiment, the relative coordinate values (Xcc-Xs, Ycc-Ys) are displayed on the display device 73 when the wire electrode 50 breaks. After visually confirming the X axis movement data of the displayed relative coordinate values, input of the data into the microcomputer 71 causes the movable table 10 to be moved along the X axis only by the amount indicated by the inputted date. Afterward, after again visually confirming the Y axis movement data of the displayed relative coordinate values, input of the data into the microcomputer 71 causes the movable table 10 to be moved along the Y axis only by the amount indicated by the inputted data. By these processes the workpiece 30 is returned to start position S. Even if the clasp 11 is located at the position indicated in FIG. 2, the workpiece 30 is moved around the clasp 11 and returned to the start position S. The workpiece 30 can therefore be returned without the nozzle and the like will hitting the clasp 11. Accordingly, the nozzle will not be damaged by hitting the clasp 11 when the workpiece 30 is returned to the starting position because the wire electrode 50 breaks.

While the invention has been described in detail with reference to specific embodiments thereof, it would be apparent to those skilled in the art that various changes and modifications may be made therein without departing from the spirit of the invention, the scope of which is defined by the attached claims.

For example, the preferred embodiment of the present invention described that the movable table 10 is moved first along the X axis by an amount indicated by the X axis movement data inputted to the microcomputer 71 and then along the Y axis by en amount indicated by the Y axis movement data incurred to the microcomputer 71. However, instead the X axis movement data and Y axis movement data can be consecutively inputted beforehand into the microcomputer 71. Afterward, the movable table 10 can be moved along the X axis by an amount indicated by the X axis movement data and then moved along the Y axis by an amount indicated by the Y axis movement data or vice versa. In this case, the X axis movement data and the Y axis movement data can be incurred through the control panel 72 by manipulating a plurality of keys, such as numeral keys, or by manipulating a single key.

The present invention is not limited to application to a wire-cut discharge device with a movable table such as depicted in the preferred embodiment. The present invention can also be applied to a wire-cut discharge device with a movable table capable of moving along three perpendicular axes, for example, a U axis, a V axis, and a B axis.

Also, in the preferred embodiment, the workpiece 30 was returned from the stop position B, that corresponds to the position where the wire electrode 50 breaks, to the starting position S. However, the workpiece 30 can be moved from the stop position B to various singular points such as the position where processes were interrupted.

The present invention allows an operator to visually confirm or recognize the relative coordinate values displayed on a display device before inputting the coordinate component of a particular axis of the displayed relative coordinate values. Accordingly, by inputting movement data for each coordinate component of the desired axis so that auxiliary objects, such as clasps for holding the workpiece, and structural objects, such as the nozzle of the wire-cut discharge device, do not interfere with each other, the moveable table, that is, the workpiece, can be returned to a particular point without auxiliary objects, such as clasps for holding the workpiece, and structural objects, such as the nozzle of the wire-cut discharge device, interfering with each other. As a result, the workpiece can be returned to the particular point without auxiliary objects, such as clasps for holding the workpiece, damaging structural objects, such as the nozzle of the wire-cut discharge device.

While only one exemplary embodiment of this invention has been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims.

What is claimed is:

1. A wire-cut discharge machine having structural components associated therewith, said machine comprising:

a table movable in X- and Y-directions perpendicular to each other, said table including means for mounting a workpiece fixedly thereto;

driving means for moving said table in the X-direction and Y-direction;

control means for controlling said driving means in accordance with machining program data so that said table moves along a programmed path including a machining singular point;

first reading means for reading the machining singular point and outputting machining singular point coordinate values;

first storing means for storing the machining singular point coordinate values outputted from said first reading means;

second reading means for reading a present position of said table and outputting present position coordinate values;

calculating means for calculating relative coordinate values between the machining singular point and the present position and outputting calculated results;

display means for displaying the calculated results outputted from said calculating means, the relative coordinate values including a relative X-axis coordinate value and a relative Y-axis coordinate value; and input means for allowing an operator to firstly input a selected one of (1) an X-axis coordinate of moving data corresponding to the relative X axis coordinate value and (2) Y-axis coordinate of moving data corresponding to the relative Y-axis coordinate value to said control means and to subsequently input moving data of the non-selected one of said X- and Y-axis coordinates to said control means, wherein said control means further controls said driving means to firstly move said table in the selected one of the X- and Y-directions corresponding to the firstly inputted moving data and then to move said table in the non-selected one of the X- and Y-directions corresponding to the subsequently inputted moving data so as to allow said table to return to the machining singular point along a path that does not interfere with said structural components.

2. A wire-cut discharge machine according to claim 1, further comprising detecting means for detecting a breakage of the wire electrode, and wherein said second reading means reads the present position of the table when said detecting means detects the breakage of the wire electrode.

3. A wire-cut discharge machine according to claim 2, wherein the present position coordinate values include coordinate values in the X-direction and the Y-direction, and wherein the relative X axis coordinate value is representative of a difference in X axis coordinate values between the machining singular position and the present position, and the relative Y axis coordinate value is representative of a difference in Y axis coordinate value between the machining singular point and the present position.

4. A wire-cut discharge machine according to claim 3, wherein said input means separately inputs first moving data corresponding to relative X axis coordinate value and second moving data corresponding to relative Y axis coordinate value, and wherein said control means controls said driving means to move said table in the X-direction when said control means receives the first moving data and to move said table in the Y-direction when said control means receives the second moving data.

5. A wire-cut discharge machine according to claim 3, wherein said input means inputs first moving data corresponding to relative X axis coordinate value and second moving data corresponding to relative Y axis coordinate value substantially simultaneously, and wherein said control means controls said driving means to move said table separately in the X-direction and the Y-direction after said input means inputs both the first moving data and the second moving data.

6. A method of controlling movement of a wire-cut discharge machine table from a first position to a second position in an X-Y plane defined by X axis and Y axis, comprising the steps of:

storing first coordinate values in the first position, the first coordinate values including X coordinate value representative of the first position along the X axis, and Y coordinate value representative of the first position along the Y axis;

reading second coordinate values in the second position and storing the second coordinate values, the second coordinate values including X coordinate value representative of the second position along the X axis, and Y coordinate value representative of the second position along the Y axis;

calculating relative coordinate values between the first coordinate values and the second coordinate values, the relative coordinate values including relative X coordinate value representative of the relative position between the first position and the second position in a direction of the X axis, and relative Y coordinate value representative of the relative position between the first position and the second position in a direction of the Y axis;

displaying the relative coordinate values;

moving the table in a selected one of the X axis direction and the Y axis direction toward the second position by a distance represented by the displayed selected relative X or X coordinate value; and thereafter moving the table in the the non-selected other direction toward the second position by a distance represented by the displayed X or Y coordinate value.

7. A method of controlling movement of a table in an X-Y plane defined by X axis and Y axis wherein the table is provided in a wire-cut discharge machine for cutting a workpiece fixedly mounted on the table with a wire electrode extending in a direction of Z axis perpendicular to both the X axis and the Y axis, comprising the steps of:

storing first coordinate values in the first position, the first coordinate values including X coordinate value representative of the first position along the X axis, and Y coordinate value representative of the first position along the Y axis;

cutting the workpiece by electric discharges generated between the workpiece and the wire electrode while moving the table in the X-Y plane in accordance with machining data;

detecting a wire breakage;

obtaining second coordinate values of a position where the wire is broken, the second coordinate values including X coordinate value representative of the second position along the X axis, and Y coordinate value representative of the second position along the Y axis;

calculating relative coordinate values between the first coordinate values and the second coordinate values, the relative coordinate values including relative X coordinate value representative of the relative position between the first position and the second position in a direction of the X axis, and relative Y coordinate value representative of the relative position between the first position and the second position in a direction of the Y axis;

displaying the relative coordinate values;

moving the table in the X axis direction toward the second position by a distance represented-by the displayed relative X coordinate values and thereafter moving the table in the Y axis direction toward the second position by a distance represented by the displayed Y coordinate value.

* * * * *